United States Patent
Boehler et al.

(10) Patent No.: US 12,533,210 B2
(45) Date of Patent: Jan. 27, 2026

(54) STERILE CONTAINER WITH AN NFC MODULE

(71) Applicant: Aesculap AG, Tuttlingen (DE)

(72) Inventors: Lukas Boehler, Furtwangen (DE); Matthias Henke, Villingen-Schwenningen (DE); Mateusz Daniol, Kozlow (PL)

(73) Assignee: Aesculap AG, Tuttlingen (DE)

( * ) Notice: Subject to any disclaimer, the term of this patent is extended or adjusted under 35 U.S.C. 154(b) by 718 days.

(21) Appl. No.: 17/871,483

(22) Filed: Jul. 22, 2022

(65) Prior Publication Data

US 2022/0354617 A1 Nov. 10, 2022

Related U.S. Application Data

(63) Continuation-in-part of application No. PCT/EP2021/051165, filed on Jan. 20, 2021.

(51) Int. Cl.
| | |
|---|---|
| *B01J 19/32* | (2006.01) |
| *A61B 50/30* | (2016.01) |
| *A61B 90/00* | (2016.01) |
| *A61B 90/98* | (2016.01) |
| *A61L 2/28* | (2006.01) |
| *B65D 6/08* | (2006.01) |

(52) U.S. Cl.
CPC .............. *A61B 90/98* (2016.02); *A61B 50/30* (2016.02); *A61B 90/06* (2016.02); *A61L 2/28* (2013.01); *B65D 7/14* (2013.01); *A61L 2202/14* (2013.01); *A61L 2202/18* (2013.01); *A61L 2202/24* (2013.01)

(58) Field of Classification Search
CPC ....... C12M 45/22; C12M 2/08; A01N 1/0226; A01N 1/0247
USPC ................... 62/80; 435/1, 240.2; 422/561
See application file for complete search history.

(56) References Cited

U.S. PATENT DOCUMENTS

| | | | |
|---|---|---|---|
| 10,368,958 B2 | 8/2019 | Wehrle et al. | |
| 2004/0194471 A1 | 10/2004 | Rickson | |

(Continued)

FOREIGN PATENT DOCUMENTS

| | | |
|---|---|---|
| CN | 204193121 U | 3/2015 |
| DE | 102015109415 A1 | 12/2016 |

(Continued)

OTHER PUBLICATIONS

Search Report received in German Application No. 10 2020 101 654.9 dated Oct. 7, 2020, with translation, 12 pages.

(Continued)

*Primary Examiner* — Monzer R Chorbaji
(74) *Attorney, Agent, or Firm* — Christopher A. Rothe; CM Law

(57) ABSTRACT

A sterile container for sterilizable medical goods includes a receiving space for the medical goods and a data acquisition unit for acquiring parameter data of influencing variables that act on the sterile container. The sterile container includes an NFC module with at least one sensor for acquiring sterility-relevant and/or sterilization-relevant data and a data logger for recording and storing data from the sensor at a recording interval. The sterile container can be monitored by a method that is automatic and sterile-container-specific.

19 Claims, 3 Drawing Sheets

(56) References Cited

U.S. PATENT DOCUMENTS

Figure 1:
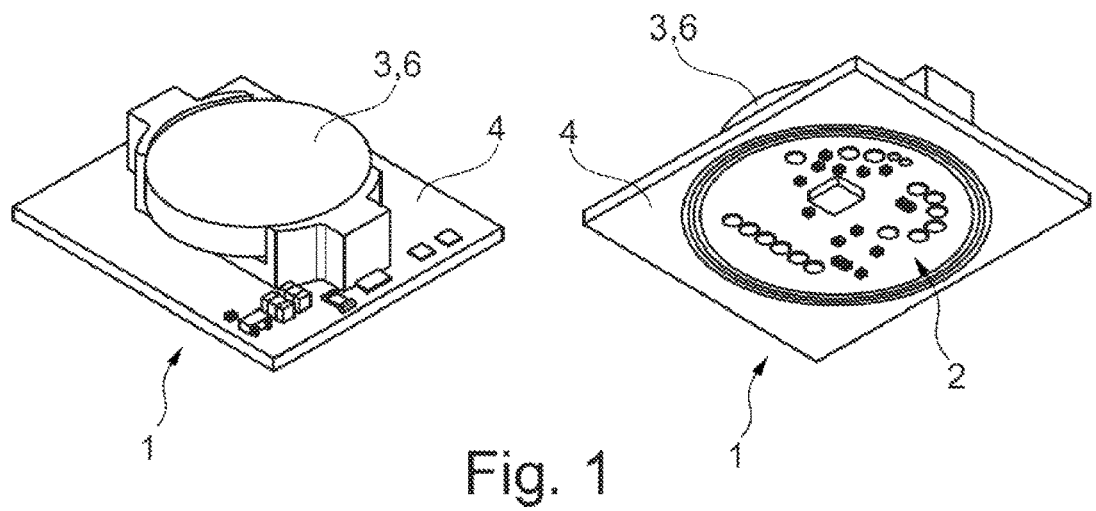

| | | | |
|---|---|---|---|
| 2010/0175393 A1* | 7/2010 | Burke | A01N 1/146 340/584 |
| 2017/0224859 A1 | 8/2017 | Broninx et al. | |
| 2018/0078331 A1 | 3/2018 | Khalife et al. | |
| 2018/0153639 A1 | 6/2018 | Wehrle et al. | |
| 2019/0321132 A1 | 10/2019 | Weir et al. | |

FOREIGN PATENT DOCUMENTS

| | | |
|---|---|---|
| DE | 102018221523 A1 | 6/2019 |
| EP | 1420573 A2 | 5/2004 |
| EP | 2387686 A1 | 11/2011 |
| WO | 2008141936 A2 | 11/2008 |
| WO | 2010083156 A1 | 7/2010 |
| WO | 2016188959 A1 | 12/2016 |
| WO | 2017044906 A2 | 3/2017 |

OTHER PUBLICATIONS

Search Report received in International Application No. PCT/EP2021/051165 dated May 10, 2021, with translation, 6 pages.
Written Opinion received in International Application No. PCT/EP2021/051165 dated May 10, 2021, with translation, 14 pages.
Office Action received in Chinese Application No. 202180010726.1 dated Jun. 13, 2025, with translations, 24 pages.

* cited by examiner

STERILE CONTAINER WITH AN NFC MODULE

CROSS-REFERENCE TO RELATED APPLICATIONS

This application is a continuation-in-part under 35 U.S.C. § 365(c) of International Application No. PCT/EP2021/051165, filed Jan. 20, 2021, and claims priority to German Application No. 10 2020 101 654.9, filed Jan. 24, 2020. The contents of International Application No. PCT/EP2021/051165 and German Application No. 10 2020 101 654.9 are incorporated by reference herein in their entireties.

FIELD

The present invention relates to a sterile container for sterilizable medical goods, comprising a receiving space for the medical goods and a data acquisition unit for acquiring parameter data of influencing variables that act on the sterile container. Moreover, it relates to a method for monitoring such a sterile container.

BACKGROUND

Sterilizable medical goods such as medical instrument sets are usually subject repeatedly to a utilization cycle comprising sterilization, storing, and usage, for instance, in the scope of an operation. For the purposes of ensuring quality, monitoring and documentation as comprehensive as possible of such utilization cycles is of advantage. On the one hand, the sterilization as such has to be monitored, i.e. to find whether it was carried out successfully and how often sterilization took place. On the other hand, transportations and storages have to be monitored so as to ensure, for instance, that no damage (which is not or hardly visible) to the goods has occurred and/or that temperature limits were observed at any time during the storage of temperature-critical goods.

Systems and methods are known which either serve for a monitoring/documentation of the actual sterilization in the sterilization device, or those that monitor/document the transportation and/or the storage after the sterilization. The latter systems/methods in accordance with the state of the art deal predominantly with the pure monitoring of transports. Parameters such as accelerations, rollovers and position of the sterile container are acquired. The monitoring devices used for this purpose are, in the simplest cases, of mechanical design, but may also comprise electronic systems adapted to communicate with a cloud. In accordance with the state of the art, monitoring of storage conditions takes place predominantly by central measurement units which monitor an entire storage area and are not assigned firmly to a particular sterile container. For monitoring the actual sterilization, either the sensors of the autoclave used for sterilization are used in the state of the art, or in individual cases manual temperature loggers adapted to record temperature curves.

Known systems and method for monitoring/documenting sterile containers comprise a number of disadvantages. In this context, for instance, it has to be mentioned in particular that no complete monitoring of complete utilization cycles/sterile goods cycles takes place, i.e. both transportation as well as storage and sterilization are not monitored and documented by means of one system/one method. Another disadvantage is that no individual and especially offline available complete data collections concerning transportation, storage, and sterilization of particular sterile containers or instrument sets are available. Moreover, monitoring does not take place in a container-specific fashion, i.e. assigned to a very particular container. An advantage associated with complete monitoring is also that no automatic detection of sterilization cycles and correct parameter curves (such as, for instance, of pressure and/or temperature) is possible, and that no programmable parameter limits and/or histories can be used.

SUMMARY

Against this background it is an object of the present invention to reduce the above-mentioned disadvantages of the state of the art and to enable in particular a complete, safe, simple, sterile container-specific and automatic monitoring of sterile containers, such as sterile containers, screen baskets, or outer packaging during entire utilization cycles, i.e. an automatic monitoring of transportation, storage, sterilization, etc.

In accordance with the present invention this object is solved by a sterile container for sterilizable medical goods, comprising a receiving space for the medical goods and a data acquisition unit for acquiring parameter data of influencing variables that act on the sterile container, wherein the sterile container comprises a near field communication ("NFC") module with at least one sensor for acquiring sterility-relevant and/or sterilization-relevant data and a data logger for recording and storing data from the sensor at a recording interval.

Advantageous embodiments of the invention will be explained in detail in the following.

The general idea of the invention consists in the use of an NFC module for data acquisition and preferably for data transfer to reading units such as, for instance, smart devices. Since the sterile container, which may especially be a sterile container, a screen basket or an outer packaging, comprises the NFC module, a permanent, constant and firm allocation/association of sterile container and NFC module exists. Consequently, the invention may advantageously effect a complete, sterile container-specific, and automatic monitoring of sterile containers such as sterile containers, screen baskets or outer packaging during entire utilization cycles. This means that this monitoring takes place both during the transportation and during the storage and sterilization/cleaning.

The sensor or the sensors of the NFC module are adapted to acquire, constantly/permanently or at particular measurement times or intervals (recording interval), especially excited by the data logger, data/parameters relevant for the sterility and/or for the sterilization. They serve especially for a detection of presently prevailing conditions which the sterile container is subject to. Such data/parameters are, in addition to the data/parameters existing during the sterilization, also those that exist during a transportation and/or the storage of the sterile container. Such data/parameters comprise, for instance, temperature values and/or pressure values and/or moisture values and/or pH values and/or acceleration values and/or position values. The evaluation of the acquired sensor data/parameters may give information about the environment and/or the situations which the sterile container is/was subject to both currently and over a lengthy period. In the following Table, various parameters and their influence are listed:

|  | Transport damage | Storage | Cleaning | Sterilization |
|---|---|---|---|---|
| Temperature | not relevant | important | very important | very important |
| Pressure | not relevant | not relevant | not relevant | important |
| Air moisture | not relevant | important | important | important |
| pH value | not relevant | not relevant | important | relevant |
| Acceleration | very important | not relevant | not relevant | not relevant |
| Gas | not relevant | not relevant | not relevant | important |

The invention comprises various embodiments in which different numbers of different parameters are collected. Thus, in a basic variant, for instance, only temperature data and acceleration data may be acquired so as to be able to count sterilizations and detect downfalls. The possibility of an acquisition of further data may be pre-installed in the scope of the invention, but it may be possible that their acquisition and processing are activated later only.

The temperatures which the sterile container is subject to and which are acquired/measured in the scope of the invention may, on the one hand, be outside temperatures, i.e. those of an environment of the sterile container, such as in a sterilization device, autoclave, etc. On the other hand, temperatures in the interior of the sterile container may be acquired/measured in the scope of the invention. The invention also comprises those embodiments in which outside temperatures and inside temperatures are acquired/measured. In the scope of the invention, data/parameters may be measured both continuously or at particular intervals.

In order to be able to recognize transport damages safely, it is necessary to indicate limit values/limit parameters for an acceleration range which demonstrably does not result in significant damage to the sterile container and to the instruments received therein. Any deviation from such limit values/limit parameters caused, for instance, by a quick rollover or a downfall with high acceleration, is detected by the invention in a simple and reliable manner and signaled as a possible damage.

For a quality-assuring acquisition of correct storage conditions, limit values/limit parameters for temperature and/or moisture and/or pressure which should not be undercut or exceeded may be determined in accordance with an embodiment of the invention.

The monitoring of cleaning/sterilization in a cleaning and disinfection device may, in accordance with the invention, take place in a simple and reliable manner by the acquisition of at least the temperature. Air moisture and/or pressure and/or pH value are additional data which may be evaluated in the scope of the invention. By means of a standardization of in-house processes the values measured may be compared with parameter curves for alignment. If they concur with a predetermined tolerance, the process may be confirmed. After confirmation, the number of sterilizations run through may be stored. It is a particularity of the invention that, moreover, the automated detection of cleaning and sterilization processes is possible in the scope of the monitoring of the entire utilization cycle.

In particular, in accordance with one embodiment of the invention, the NFC module may be adapted for an automatic and sterile container-specific acquisition of sterilization cycles performed by means of a sterile container, in that, with a temperature measuring device assigned to the sterile container, a temperature acting on the sterile container is acquired, the temperature measuring device acquires the temperature at predetermined first time intervals, after the exceeding of a predetermined first limit temperature, temperature values acquired are stored in a memory, the storing of acquired temperature values is stopped after the undercutting of a predetermined second limit temperature or after the expiration of a predetermined period after the exceeding of the first limit temperature, the temperature values stored are compared with reference temperature values, wherein a deviation of the temperature values from the reference temperature values is determined, and, in the case of a deviation within a predetermined tolerance range, a counter and/or a display device is/are actuated. The first limit temperature and/or the second limit temperature may be adapted in line with a requirement so as to cover and take into account different ambient conditions. By the selection of the two limit temperatures it is possible to define a range in which the existence of a sterilization process is assumed.

Moreover, the NFC module may be adapted to also compare, in the scope of the cleaning/sterilization monitoring, the temperature values stored with reference temperature values and to determine a deviation of the temperature values from the reference temperature values. This may take place in real time continuously during the measurement of the temperature, or else only after the undercutting of the second temperature limit or a time limit. Specifically, the values acquired may be compared with a predetermined temperature-time-curve and be evaluated in the scope of a tolerance range.

One may say that the cleaning/sterilization monitoring offers the possibility of a kind of basic monitoring/coarse monitoring, on the one hand, and the possibility of a sterilization monitoring/fine monitoring, on the other hand. In the scope of the basic monitoring/coarse monitoring the temperature acquisition takes place at the first time intervals, i.e. at the intervals determined/defined by the first time intervals. In the scope of the sterilization monitoring/fine monitoring the temperature acquisition takes place at the second time intervals, i.e. at the intervals determined/defined by the second time intervals. Due to an appropriate selection of the length of the first and second time intervals it is possible to adapt the coarse monitoring and the fine monitoring optimally to the respectively existing situations.

The coarse monitoring enables especially a continuous or a long-term monitoring of the sterile container with respect to a cleaning/sterilization monitoring. The sterile container may, for instance, be monitored in an entire period between two test cycles. The first time intervals may be chosen relatively long, so that also in the case of a storage of the temperature values acquired in this process, for instance, in the scope of quality assurance, the data amounts acquired do not become too large with a continuous monitoring over a long period. A constant, complete monitoring over the entire operating time and/or lifetime of the sterile container is quasi possible.

In the case of the fine monitoring, which is triggered by the exceeding of the first limit temperature, a particularly fine monitoring of a cleaning/sterilization cycle or of a possibly existing cleaning/sterilization cycle may take place. The second time intervals may be chosen to be relatively short, i.e., shorter than the first time intervals, so that a particularly fine/fine-meshed monitoring of the sterile container is possible after the exceeding of the first limit temperature. The large data amounts produced in the case of a fine-meshed monitoring are relatively uncritical since the fine monitoring usually takes place over relatively short periods only, namely until the second limit temperature is undercut and the recording of the temperature values is stopped. Thus, a particularly fine monitoring of a cleaning/sterilization process is possible.

A particular advantage is that the changes from coarse monitoring to fine monitoring take place automatically, triggered by the exceeding of the first limit temperature. Likewise, the changes from the fine monitoring to the coarse monitoring take place automatically, triggered by the undercutting of the second limit temperature. Thus, an automatic detection of sterilization cycles and/or an acquisition of temperature profiles, a measurement at predetermined time intervals, and a comparison with predetermined temperatures/temperature profiles is advantageously enabled. Moreover, the changes between the measurement intervals may take place automatically.

In the scope of the cleaning/sterilization monitoring it is, moreover, possible to determine a deviation of the temperature values from the reference temperature values. If the deviation lies within the predetermined tolerance range, the existence of an actual sterilization process/sterilization cycle is assumed and a counter, in particular in the form of an incrementable cycle counter, is used for documenting the sterilization processes performed with the sterile container. Thus, it is advantageously possible to effect an automatic acquisition and indication of sterilization cycles performed with the sterile container.

One embodiment of the invention is characterized in that the NFC module comprises an energy storage. This energy storing unit may in particular be chargeable by means of NFC or energy harvesting. Alternatively or additionally, the NFC module may comprise an energy storage in the form of a battery or an accumulator, especially a high-temperature button cell. Moreover, it may comprise an energy generating unit, especially in the form of a Peltier element, a solar cell, especially an indoor solar cell, or a turbine. Such a turbine is preferably drivable by means of the application of a medium by a cleaning tube of a cleaning and disinfection device.

In accordance with a further embodiment the NFC module may comprise a control unit, especially a micro controller. The micro controller may be equipped with a data storage for the autonomous acquisition, storage, and evaluation of parameters.

Advantageously, the NFC module may comprise a fluid-tight outer sheath/housing. It may especially consist of an epoxy resin. Preferably, the outer sheath has a flat design. Moreover, the NFC module may comprise a thermal insulation, especially using highly-efficient insulation materials such as, for instance, an aerogel, silicone, or epoxy resin.

Preferably, the NFC module is mounted at or integrated in the sterile container. In accordance with a particularly advantageous and robust embodiment the NFC module is integrated/injected in a container membrane of the sterile container or integrated/injected in a filter cover. Moreover, it may be provided at screen baskets or outer packaging. Thus, a firm allocation of the NFC module to a particular sterile container may exist and a safe and unambiguous identification of the sterile good contained therein may take place. In the case of sterile containers, the damages and sterilization cycles thereof may be acquired and be stored in the data logger and optionally in a management software. In the case of screen baskets, data about instrument sets contained therein may be stored. In the case of constant equipment it is thus also possible to acquire and store cycle numbers for individual instruments. Binding to/data communication with a management system for data evaluation and for the reading of alerts in the operating room especially by mobile reading units or during equipping in the central sterile supply department is also within the scope of the invention.

A further embodiment of the invention is characterized in that the NFC module comprises a temperature sensor and/or an acceleration sensor and/or a pressure sensor and/or a moisture sensor and/or a pH sensor and/or a gas sensor. In this manner the NFC module is suited for an acquisition and processing of a large number of different data/parameters which the sterile container may be subject to. Preferably, except for the acquisition of transport damages, sensor values are acquired at predetermined intervals. In this manner it is possible to keep the energy consumption for the continuous monitoring especially low, which guarantees a safe and long-standing function of the NFC module. For this purpose, especially passive acceleration sensors may be used which trigger from a predetermined limit on.

A further embodiment of the invention is characterized in that the NFC module comprises an NFC interface adapted for data communication with a reading unit/programming unit. Preferably, this interface is a smart phone-compatible NFC interface. Thus, it is possible to store updates or adapted parameters without having to provide a physical access to the module or to damage the housing/insulation thereof. Furthermore, it is possible to activate or program additional functions in a particularly simple and user-friendly manner.

One may also say that the invention comprises an autonomous module/an autonomous NFC data logger which may be used by means of different sensors for transportation, storage, and sterilization monitoring. The module/the data logger may be mounted at different positions at or in the sterile container, the screen basket, or outer packaging so as to be able to unambiguously assign collected data, and it is preferably thermally insulated and/or hermetically sealed. Its energy supply may take place by means of an exchangeable battery or energy harvesting, which may be used both by the sterilization and the cleaning or the storing for the generation of energy. The invention may comprise the use of sensors (especially for temperature, pressure, air moisture, pH, gas, acceleration) for the acquisition of cleaning, sterilization, and possible damages. A comparison of sensor values with stored specification curves and predetermined tolerances for the verification of a sterilization, cleaning or correct storage is particularly advantageous. By interval measurements and the use of passive acceleration sensors it is possible to effect a minimization of the energy consumption. In this context, by means of the invention it is possible to effect a service life maximization by the use of energy harvesting during cleaning, sterilization, and storage for energy generation.

Embodiments of the invention may especially enable the following advantages:
- Monitoring of sterile containers such as sterile containers, screen baskets, and outer packaging as well as instruments/implants contained therein, especially long-term monitoring/lifetime monitoring
- Acquisition of sensor values for monitoring ambient parameters
- Automatic detection of successful sterilization and/or cleaning by a comparison of sensor values with predetermined target values/target value profiles, especially temperature (and pressure) curves
- Automatic storing of transport events (downfalls, rollovers, temperature or air moisture beyond limit)
- Simple reading of data/parameters and/or programming by means of NFC via reader or smart phone Firmly assigned mounting of the NFC logger directly at the sterile container, screen basked, transport box, or outer packaging Energy supply by energy harvesting (Peltier element, solar cell, turbine) or battery Reliable acquisition of cycles (cleaning, sterilization) and storage conditions by comparison of sensor values with stored parameter curves and a tolerance range. In comparison to bi-metals, in an energy-saving manner several data values are thus acquired during the process and compared with nominal values, which prevents a wrong indication.

Reversible acquisition of possible transportation damages by acceleration sensors. In contrast to acceleration indicators these may be reset and be read automatically with a scanner.

Prolongation of the service life by the use of energy harvesting modules

An acquisition of sterilization cycles enables control of the "lifetime" indicated. If it is exceeded, a message may be output which requests service. If further cycles are to be activated, this may be programmed in the data logger or the management system without having to exchange the hardware.

BRIEF DESCRIPTION OF THE DRAWING FIGURES

Further features and advantages of the present invention result from the following exemplary and non-limiting description of the Figures. They are merely of schematic nature and only serve for the understanding of the invention.

Figure 2:
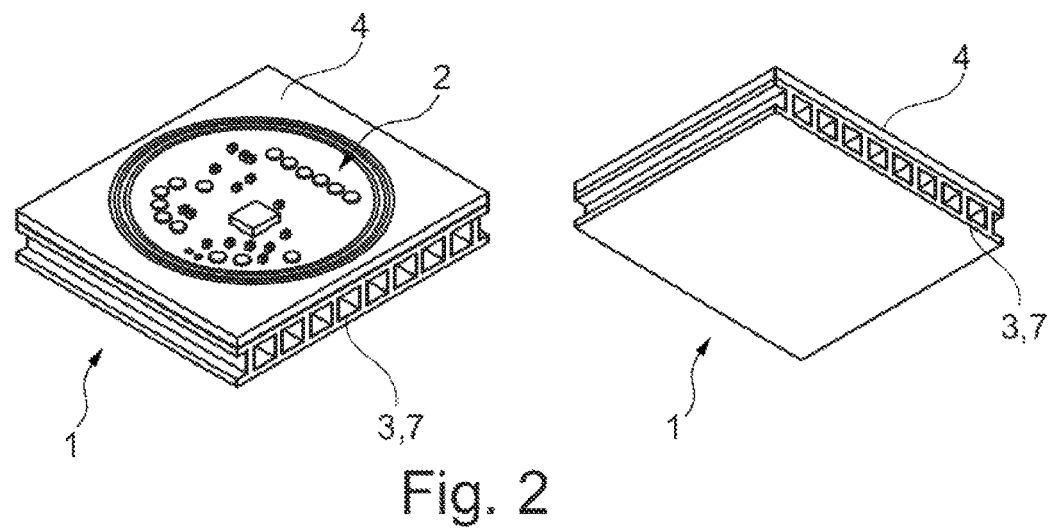
Figure 3:
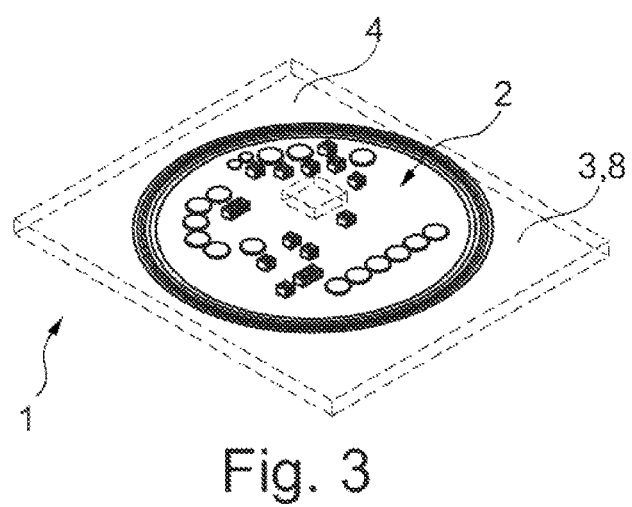
Figure 4:
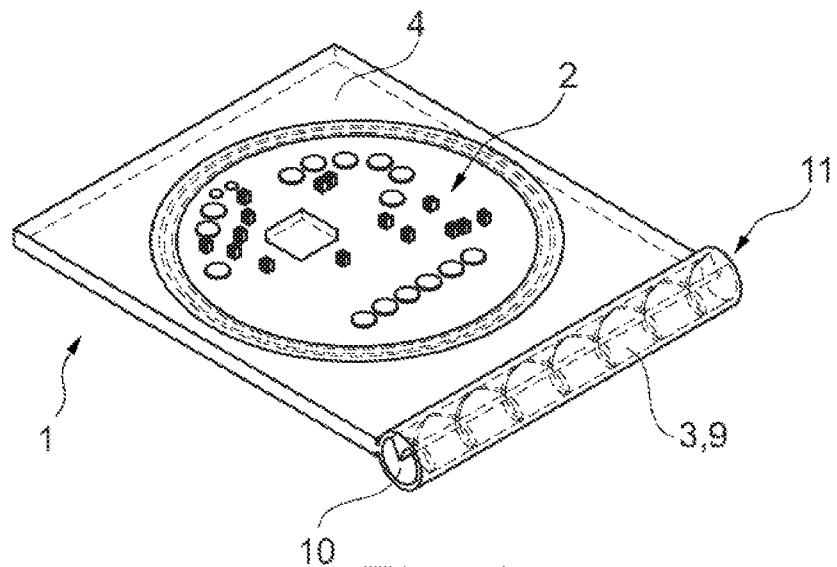
Figure 5:
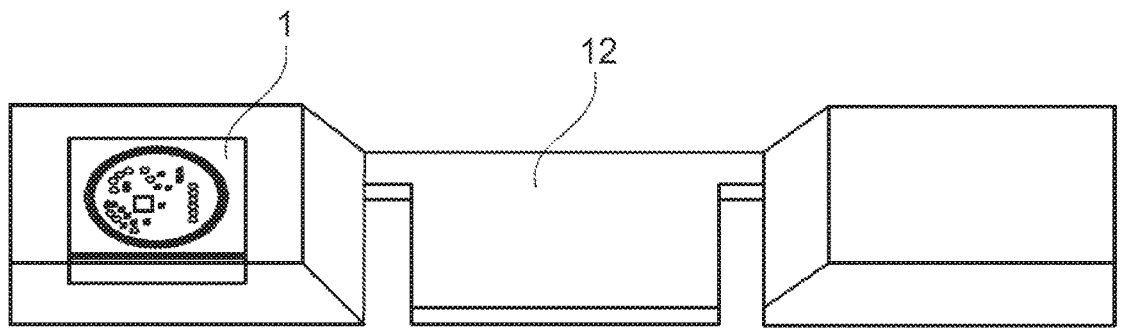
Figure 6:
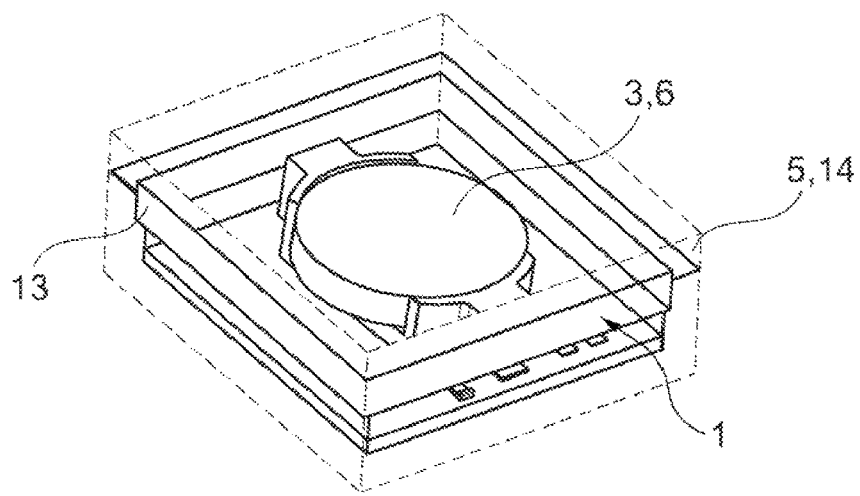
Figure 7:
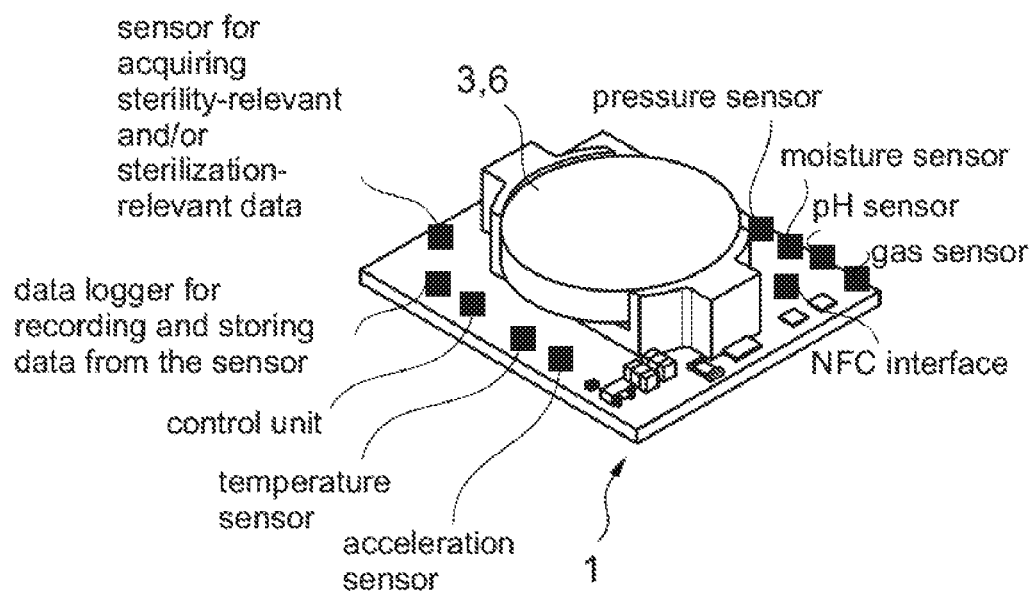
Figure 8:
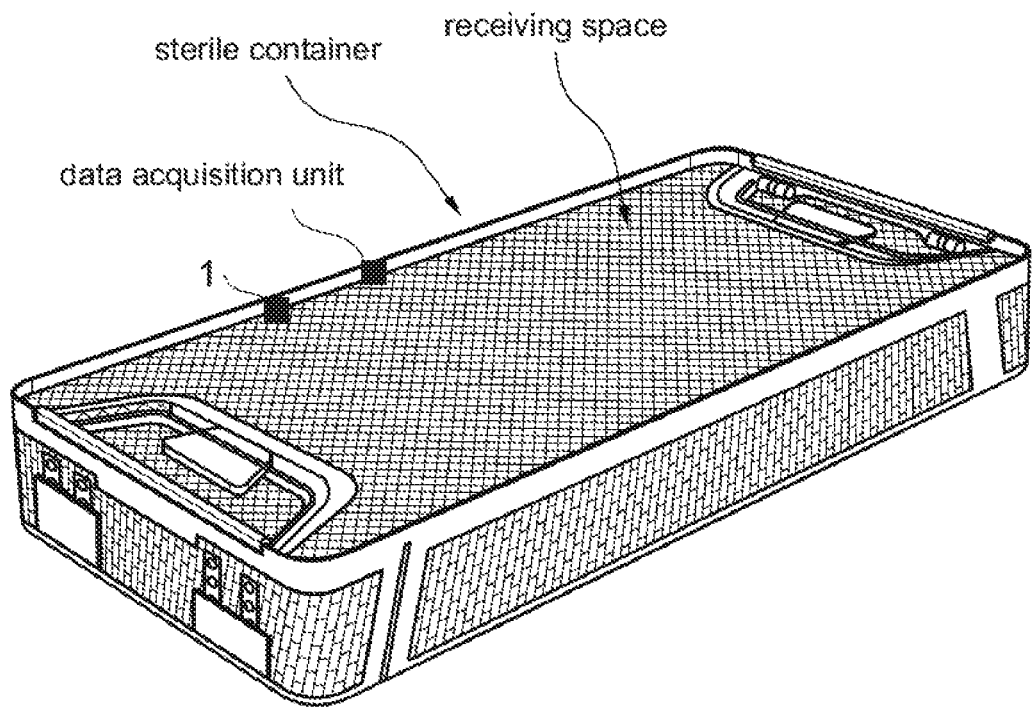

FIG. 1 shows an embodiment of an NFC module with a battery in two perspective representations from different directions of view, FIG. 2 shows an embodiment of an NFC module with a Peltier element in two perspective representations from different directions of view, FIG. 3 shows an embodiment of an NFC module with a solar cell in a perspective representation, FIG. 4 shows an embodiment of an NFC module with a turbine in a perspective representation, FIG. 5 shows an NFC module integrated in a container membrane, FIG. 6 shows an NFC module integrated in a housing for mounting to a screen basket, FIG. 7 shows an NFC module with sensors and a data logger, and FIG. 8 shows a sterile container with a receiving space and a data acquisition unit.

DETAILED DESCRIPTION

The NFC module 1 in FIGS. 1 to 4 comprises an electronic circuit 2 and an energy supply unit 3. The circuit 2 is formed on a printed circuit board 4 and comprises—not characterized in detail in the Figures—a data logger, a sending/receiving circuit, especially in the form of an NFC interface, a storage unit, and a micro controller. The energy supply unit 3 serves for an energy supply of the electronic circuit. As is illustrated in particular in FIG. 6, the NFC module 1 is received in a housing 5. It surrounds the NFC module 1 in a hermetically sealed/fluid-tight manner.

In the embodiment of FIG. 1 the energy supply unit is implemented in the form of a micro button cell 6. It may be designed as an accumulator 6 chargeable especially by means of NFC (wireless charging). In the case of a battery 6 the housing 5 is accessible so as to be able to exchange same. Moreover, the housing 5 is thermally insulating, so that the battery 6 and/or the accumulator 6 is protected from harmful temperature influences which may, for instance, occur in the scope of sterilizations.

In the embodiment of FIG. 2 the energy supply unit is implemented in the form of a Peltier element 7 arranged on the underside of the printed circuit board 4 and electrically connected with the circuit 2. In this embodiment the housing 5 may be designed to be hermetically sealed without access possibility, but it is only insulated such that process heat of a cleaning process or of a sterilization process may act on the Peltier element 7 and may be used for energy supply of the circuit 2.

In the embodiment of FIG. 3 at least a part of the printed circuit board 4 is designed as an indoor solar cell 8 which is electrically connected to the circuit 2. The housing 5 is in this case light-permeable at least in the region of the solar cell 8.

The embodiment of FIG. 4 possesses, as an energy supply unit 3, a turbine 9 arranged at the edge of the printed circuit board 4 and connected electrically with the circuit 2. The turbine 9 is either arranged externally of the housing 5 or accessible from outside at the input 10 and output 11 thereof.

By means of the NFC module 1 it is possible to monitor sterile goods in a particular simple, sterile good-specific and permanent fashion. Specifically, sterilizations may be counted and possible damages may be detected. Due to its flat structure with small dimensions it is particularly easy to mount at sterile containers, screen baskets, or outer packaging.

FIG. 5 illustrates a variant in which the NFC module 1 is implemented, here injected, with the housing 5 or without the housing 5 in a panel 12 of a sterile container not shown in the Figures. The NFC module 1 with the micro controller, a temperature sensor, and a passive acceleration sensor is sheathed with an aerogel insulation 13. In order to protect it from pressure variations, the hosing 5 is designed in the form of a sheath 14 of epoxy resin. The NFC module 1 is subsequently injected in a container panel. During a transportation of the sterile container it may thus be monitored easily whether critical stresses with possible damages of the sterile container and/or the sterile good received therein occur. This is effected by means of he passive acceleration sensor which sends a signal to the micro controller from a defined (limit) acceleration on. Impacts, downfalls, and rollovers which possibly damage the container and/or the sterile good may thus be recognized reliably. By means of the NFC interface and/or by means of possibly existing optical or acoustic signal output devices such an event may be indicated to a user. The user may then carry out an additional optical check of the sterile container and/or the sterile good. The warning may subsequently be reset with an NFC-capable device.

In order to be able to detect a sterilization or cleaning in the cleaning and disinfection device, the NFC module may measure the ambient temperature by means of the data logger at predetermined intervals. The intervals may be chosen such that as little energy as possible is consumed, on the one hand, and a significant increase of the temperature may be detected, on the other hand. If a predetermined limit/limit temperature has been exceeded, the temperature data may be acquired at shorter intervals. By a comparison with previously defined temperature curves and a tolerance range it may be determined whether a successful cleaning or sterilization took place. Since the two processes differ significantly from each other, a differentiation by the micro controller may take place. In the case of a successful sterilization an internal counter may be increased. This counter may indicate the number of all sterilizations acquired so far, and may thus serve to control how often the container and/or the associated instrument set was in use. After the cleaning/sterilization the NFC module may again acquire the temperature at larger intervals, and incorrect accelerations may be acquired. By means of a reading unit, for instance, a packing space in the central sterile supply department, data like the number of sterilizations, possible damages, and/or an identification number may be read and be transferred to a management system.

FIG. 7 shows an NFC module with sensors and a data logger. FIG. 8 shows a sterile container with a receiving space and a data acquisition unit.

The invention claimed is:

1. A sterile container for medical goods, the sterile container comprising:
a receiving space for the medical goods;
a data acquisition unit for acquiring parameter data of influencing variables that act on the sterile container; and
a near field communication module comprising:
a temperature sensor for acquiring and recording temperature data at predetermined intervals; and
a data logger for recording and storing temperature data from the temperature sensor at a recording interval,
the near field communication module configured to compare the temperature data with predefined temperature curves and a tolerance range to confirm complete sterilization of the sterile container.

2. The sterile container according to claim 1, wherein the sterile container is a screen basket or an outer packaging.

3. The sterile container according to claim 1, wherein the near field communication module comprises at least one of:
an energy storage adapted to be charged by near field communication or energy harvesting;
a battery or an accumulator; and
an energy generating unit.

4. The sterile container according to claim 1, wherein the near field communication module comprises a battery or an accumulator that comprises a high temperature button cell.

5. The sterile container according to claim 1, wherein the near field communication module comprises an energy generating unit comprising a Peltier element, a solar cell, or a turbine.

6. The sterile container according to claim 1, wherein the near field communication module comprises a control unit adapted for autonomous acquisition, storage, and evaluation of data acquired by the temperature sensor.

7. The sterile container according to claim 6, wherein the control unit is a micro controller.

8. The sterile container according to claim 1, wherein the near field communication module comprises a fluid-tight outer sheath and/or a thermal insulation.

9. The sterile container according to claim 1, wherein the near field communication module comprises a fluid-tight outer sheath made of an epoxy resin.

10. The sterile container according to claim 1, wherein the near field communication module comprises a thermal insulation comprising an aerogel insulation.

11. The sterile container according to claim 1, wherein the near field communication module is injected into a container panel.

12. The sterile container according to claim 1, further comprising an acceleration sensor.

13. The sterile container according to claim 12, wherein the acceleration sensor is a passive acceleration sensor.

14. The sterile container according to claim 1, further comprising at least one of:
a pressure sensor;
a moisture sensor;
a pH sensor; and
a gas sensor.

15. The sterile container according to claim 1, wherein the near field communication module comprises a near field communication interface adapted for data communication with a reading unit/programming unit.

16. The sterile container according to claim 15, wherein the near field communication interface is compatible with a smart phone.

17. A method for automatic and sterile-container-specific monitoring of a sterile container, the sterile container having a receiving space for medical goods, a data acquisition unit for acquiring parameter data of influencing variables that act on the sterile container, and a near field communication module comprising a temperature sensor for acquiring and recording temperature data at predetermined intervals and a data logger for recording and storing temperature data from the temperature sensor at a recording interval, the method comprising:
retrieving temperature data from the temperature sensor at time intervals with the data logger and/or continuously from the temperature sensor;
storing the temperature data on the data logger; and
comparing the temperature data with predefined temperature curves and a tolerance range to confirm complete sterilization of the sterile container.

18. The method according to claim 17, further comprising the step of retrieving sterility-relevant and/or sterilization-relevant data from at least one additional sensor at time intervals with the data logger, wherein the sterility-relevant and/or sterilization-relevant data comprises at least one of:
pressure values;
moisture values; and
pH values.

19. The method according to claim 17, further comprising the step of retrieving acceleration values continuously from at least one additional sensor.

* * * * *